United States Patent Office 3,369,056

Patented Feb. 13, 1968

1

3,369,056
FLAME RETARDANT PHENOLIC RESIN COMPOSITIONS

Carl G. Schwarzer, Walnut Creek, Calif., assignor to Shell Oil Company, New York, N.Y., a corporation of Delaware No Drawing. Filed Apr. 9, 1965, Ser. No. 447,044
4 Claims. (Cl. 260—838)

ABSTRACT OF THE DISCLOSURE

Flame retardant phenolic resins are obtained by reacting a halobicycloheptenyl bisphenol with formaldehyde in the presence of alkaline catalyst. The new resins are particularly useful for preparing flame resistant laminated products.

This invention relates to novel flame retardant phenolic resins. More particularly, the invention relates to novel flame-retardant phenol-formaldehyde type resins and the useful products thereof.

Phenolic resins obtained by reacting phenol or a substituted phenol with formaldehyde in the presence of a basic catalyst are very well known materials from which useful products have long been prepared. One of the important uses of resins of this type is in the preparation of laminates. The phenolic resins used in the laminate production are designated as A or one-stage resins often referred to as resoles. These resins are thermoplastic and alcohol soluble. Although other resins such as those prepared from vinyl acetate, styrene, urea, melamine, etc. have been used to prepare laminates, the phenolic resins offer the advantages of being relatively inexpensive and yet are particularly resistant to corrosion, acids and organic solvents. In addition, laminates prepared with these resins are very heat and moisture resistant and are readily machined.

However, it has also been found that one disadvantage in the phenolic resin laminates is their susceptibility to burning when exposed to flame. Even laminates prepared with normally unflammable base materials such as glass or asbestos will ignite and continue to burn when exposed to high temperatures or flame due to the presence of from about 20 to 50% or more of resin. Thus, the application of these laminates has been somewhat limited in areas where there is danger or possibility of their being ignited.

Attempts to add fire preventive additives to the phenolic resins compositions used in preparing the laminates has not been entirely satisfactory. Many such additives normally used to impart flame retardant properties are not compatible with the phenolic resin systems. The effectiveness of the flame retardant additives is often lost during the high temperature curing phase. Additionally, these additives deteriorate with age. In other instances it has been found that the halogen containing additives are such that the halogens combine with hydrogen atoms present in the molecules of the compounds present in the phenolic resin composition thereby forming hydrogen halides which are given off during the curing or drying steps resulting in serious corrosion of the equipment being used in the process as well as presenting other hazards or inconveniences.

It is an object of this invention to provide novel flame retardant phenolic resins and cured products thereof. It is also an object of the invention to provide novel phenolic resins which are useful in preparing flame retardant laminates. These and other objects will become apparent and better understood from the following disclosure.

There has now been discovered novel flame retardant phenolic resins which accomplish the above objects. These

2 phenolic resins are reaction products of a halobicycloheptenyl bisphenol and formaldehyde in the presence of an alkaline catalyst. The reaction results in methylol substituted bisphenolic resins of the general formula

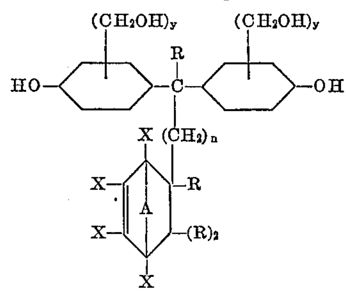

wherein each R is hydrogen or a lower alkyl of 1 to 4 carbon atoms,

X is chlorine or bromine,
A is $—CX_2—$ or $—CH_2—$, $n$ is an integer from 0 to 6 and $y$ is an integer from 0 to 2, at least one $y$ being at least 1.

The halobicycloheptenyl bisphenols are prepared by condensation of a halo-substituted bicyclic carbonyl of the formula:

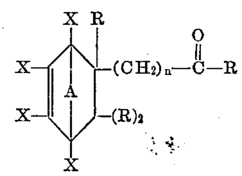

(wherein X, A, R, and $n$ are as set forth above) with phenol in the presence of an acid catalyst. The condensation proceeds under conditions wherein one molecule of the carbonyl condenses with two molecules of phenol in the presence of a sufficient amount of strong acid as disclosed generally by Martin, the Chemistry of Phenolic Resins (1965), and U.S. Patents No. 2,602,821 and 2,602-822. The reaction may take place at temperatures between about 45 and 140° C., and preferably between 45 and 80° C. Suitable halo-substituted bicyclic carbonyls are prepared by reacting together tetra- or hexahalo-1,3-cyclopentadiene, where the halogens are chlorine or bromine with a lower 2-alkenal or alkenone, thereby producing a 1:1 adduct. The halosubstituted bicyclic aldehydes and their preparation are disclosed in U.S. Patent No. 2,761,-879. Preparation of a halo-substituted bicyclic ketone and the halobicycloheptenyl bisphenols is described in copending application Ser. No. 447,091, filed April 9, 1965, the pertinent portions thereof which are incorporated herein by reference.

The formaldehyde reacted with the bisphenol is preferably utilized in the form of an aqueous solution, such as conventional 37% formalin solution. The formaldehyde and bisphenol are preferably combined in such quantities as to furnish approximately one mole and up to 5–10% excess of formaldehyde for every ring carbon atom to be reacted. Thus, a monomethylol-substituted product is obtained by the use of the reactants on a mole-to-mole basis, while the dimethylol-substituted products are obtained by using two moles of formaldehyde per mole of the bisphenol, etc.

The alkaline catalysts employed in the reactant are preferably alkali metal or alkaline earth metal hydroxide and are employed in amounts of from about 0.1% to 10% by weight of the reactants.

Solvents may also be utilized in the preparation of the methylol-substituted bisphenols. Solvents which are compatible with the phenol, such as methanol, ethanol, ketones, etc., are suitable. The amount of solvent used may vary in general from 10% to 60% by weight of the reactants.

Reaction temperatures may vary depending on the desired rate of reaction. The reaction takes place slowly at room temperature or below and faster at higher temperatures. Preferable reaction rates are obtained by employing temperatures between about 50 and 100° C.

Upon completion of the reaction, as characterized by the disappearance of the majority of the formaldehyde applied, the alkaline catalyst is neutralized by the addition of acid material, such as dilute sulfuric or hydrochloric acid and the solvent removed by distillation.

By "methylol-substituted" as used herein is also meant the substituted methylol groups, such as —CHOR groups where R is preferably hydrocarbon or substituted hydrocarbons as $—CHOHCH_3$ and $—CHOHCH{=}CH_2$. These substituents are obtained by substituting other aldehydes such as acetaldehyde, acrolein, chloral, etc., for formaldehyde and using more stringent reaction conditions. However, formaldehyde is the preferred reactant.

The resins may be cured at temperatures between about 250 and 450° F. and preferably between about 300 and 400° F. Acidic or basic curing accelerators may be also used in the curing phase as is well known to those skilled in the art. The phenolic resins of this invention have the advantage of having high flame retardant properties per unit weight of resin due to the high halogen content. These halogen atoms are present only in the halobicycloheptenyl moiety of the resin molecule and thereby do not interfere with the functionality of the reactive methylol groups or the phenolic hydroxyl groups. In addition the halogen atoms are substantially separated from reactive hydrogen atoms present in the phenolic groups in the molecule and thus, possible reactivity therewith to produce undesirable hydrogen halides is minimized. These phenolic resins are easily cured by the mere application of heat and/or the presence of acids or bases as in methods known for curing the resole resins.

These phenolic resins may be used to prepare molded and cast plastic articles, adhesives, paints, coatings, etc. and are especially desirable for their flame retardant properties. The resins are especially desirable in preparing laminates.

In preparing laminates having flame retardant or self-extinguishing properties according to this invention, base core materials are impregnated with the phenolic resin followed by a curing process. Any of the well known methods of preparing laminates may be used.

Thus, for example, phenolic resin may be dehydrated in some manner to remove the water present. The resin which is a dark, viscous material may then be mixed with alcohol until a solution of the desired consistency and viscosity is obtained which will permit ease of handling and impregnation of the base material to be laminated. Suitable base materials include paper, fabrics, such as cotton, nylon, oriented fibers, plywood, glass floc or cloth, asbestos fibers, talc, mica, etc. The resin solution is placed in a trough or other suitable vessel through which the base material may be passed thereby becoming impregnated and coated with the resin. The impregnated material is then dried or partially cured to any desired extent. Generally, the drying is accomplished by passing sheets of impregnated base material through a suitable drying apparatus or by other methods well known to those skilled in the art.

The dried impregnated base material may then be cut to any desired size and shape and the sheets placed together. The number of sheets or plies of the material depends on the final thickness and strength desired. The material is then placed in a press at temperatures from about 250–450° F. and temperatures up to about 10,000 p.s.i. Generally, for high pressure laminates, pressures between about 1000 and 3000 p.s.i. are satisfactory and preferred. Depending on the intended use of the laminated material, variations appreciated by those skilled in the art may be utilized. The ratio of resin to base material may thus be varied as desired. Generally, the amount of resin used is to provide between about 10 to 70% by wenght of the base material.

Methods other than high pressure lamination may be preferred such as contact laminating, etc. where the impregnated material is subjected to much lower pressures e.g., up to 500 p.s.i.

The laminated materials may then be subjected to finishing operations such as machining, polishing and buffing, etc.

The phenolic resins of the invention may be used as the only resin composition for impregnating the base materials or may be mixed with other impregnating resins. Thus, it may be desirable to mix the halobicycloheptenyl bisphenol-formaldehyde resins with resins such as urea-formaldehyde, melamine-formaldehyde, or phenol-formaldehyde resins and the like in suitable proportions. Such mixtures of resins may be quite desirable where respective advantages of the individual resins such as cost, strength, heat conductivity, fire retardance, etc. are sought.

Under proper conditions, it has also been found that the resins of this invention may be prepared in a common reaction mixture with other formaldehyde type resins. Thus, according to a special embodiment of this invention, phenol and a halobicycloheptenyl bisphenol may be reacted with formaldehyde in a single reaction vessel thereby providing a mixture of the two resins. The relative proportions of the different phenols used is dependent on the ratio of the two different resins desired in the final product. The mole ratio of phenol: halobicycloheptenyl bisphenol is preferably between about 4:1 and 1:20, respectively, in order to produce a mixture of the corresponding phenolic resins in the same mole ratios, which will provide the desired flame-retardancy to the laminate prepared therefrom. The process advantages to this method of preparing a mixture of phenol-formaldehyde resins are obvious. As noted above, other materials may be used to react with formaldehyde concurrently with the halogen containing bisphenol such as urea or melamine, depending on the properties of the impregnating resin desired. However, phenol is preferred because of its low cost as well as the desirable properties of the cured resin, such as, resistance to chemicals, solvents and corrosion, low heat conductivity, high heat resistance and good dimensional stability over a wide temperature range. The two phenols are suitably reacted with formaldehyde in the presence of the same alkaline catalysts and conditions for the bisphenol reaction-formaldehyde reaction set forth above.

The final flame-retardant or self-extinguishing laminates prepared according to this invention may be used in engineering materials, gears, bearing surfaces, electrical insulation, table and sink tops, liners and insulation in automotive or aircraft industries and the like.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

*Example I*

A mixture of 100 g. bis(hydroxyphenyl)-[1,4,5,6,7,7-hexachlorobicyclo(2.2.1) - 5 - heptene-2]methane, 55 g. methanol, 32.5 g. of 37% formaldehyde, and a solution of 8 g. sodium hydroxide in 8 g. $H_2O$ was heated to reflux for 45 minutes after which time HCl was added to neutralize the catalyst to a pH of 6–7. Methanol was removed by distillation at 50° C. and 20 mm. pressure. The resin was then separated from the aqueous phase by decantation.

The resin was then diluted to a 50% solution with methanol. The solution was placed into a trough equipped with rollers and a 4 inch wide strip of kraft paper was passed through the solution thus becoming saturated with the resin. The paper was allowed to dry at room temperature for about ½ hour. The paper strip was then cut into twenty-four inch lengths which were placed on top of one another. The stack of paper was then placed into a press and cured at 1000 p.s.i. and 300° F. for 20 minutes. The resulting laminate was a hard, stiff sheet which was self-extinguishing when ignited.

*Example II*

A mixture of 100 g. of bis(hydroxyphenyl)-[1,4,5,6,7,7-hexachlorobicyclo(2.2.1 - 5 - heptene-2]methane, 53 g. methanol, 46 g. of formalin (37% formaldehyde) and 18 g. of a 44% aqueous sodium hydroxide solution was heated to a reflux for 30 minutes and then cooled. To the reaction mixture was added 94 g. phenol, 100 g. of 37% formaldehyde and 40 g. of a 50% aqueous sodium hydroxide solution. The mixture was heated to reflux for 20 minutes after which the catalyst was neutralized with HCl to a pH of about 7. The mixture was heated to 50° C. at 20 mm. pressure to remove the methanol. The resin was freed of the water phase by decantation.

Methanol was added to the resin to adjust the viscosity for suitable paper impregnation and coating. The lamination process set forth in Example I was repeated with the curing taking place at 320° F. and 1000 p.s.i. for 60 minutes. The hard laminate showed good flame retardant properties.

I claim as my invention:

1. A flame retardant phenolic resin of the formula

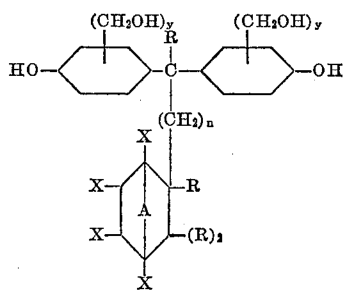

wherein each R is selected from the group consisting of hydrogen and a lower alkyl of from 1 to 4 carbon atoms, X is chlorine or bromine, A is selected from the group consisting of $—CX_2$ and $—CH_2—$, $n$ is an integer from 0 to 6, and $y$ is an integer from 0 to 2 with at least one $y$ being at least 1.

2. A cured polymer obtained by heating the resin of claim 1 at temperatures between about 250° F. and 450° F.

3. A flame retardant resin composition comprising the resin of claim 1 and a phenol-formaldehyde resin in the mole ratio of from about 1:4 and 20:1, respectively.

4. A cured polymer obtained by heating the composition of claim 3 between about 250° F. and 450° F.

No references cited.

WILLIAM H. SHORT, *Primary Examiner.*

H. SCHAIN, *Assistant Examiner.*